Sept. 20, 1966     E. G. GRAF     3,274,467

CERAMIC CAPACITOR

Filed May 17, 1963

INVENTOR

ERNEST G. GRAF

BY *Ashlan F. Harlan Jr.*

ATTORNEY 3,274,467
CERAMIC CAPACITOR
Ernest G. Graf, North Tonawanda, N.Y., assignor to National Lead Company, New York, N.Y., a corporation of New Jersey
Filed May 17, 1963, Ser. No. 281,301
12 Claims. (Cl. 317—258)

The invention of the present application relates to capacitors and is particularly concerned with capacitors suitable for use in low voltage electronic circuits which have high capacities per unit area and relatively low dissipation factors.

It is an object of the invention to provide capacitors of the character described.

Another object of the invention is to provide a novel and economical way to produce capacitors of the character described.

Other objects and advantages of the present invention will be apparent from the following description taken in conjunction with the accompanying drawings in which.

Figure 1:
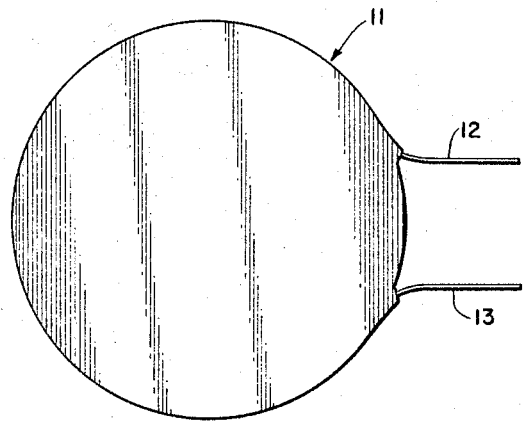
FIGURE 1 is a plan view of a capacitor according to the invention.
Figure 2:
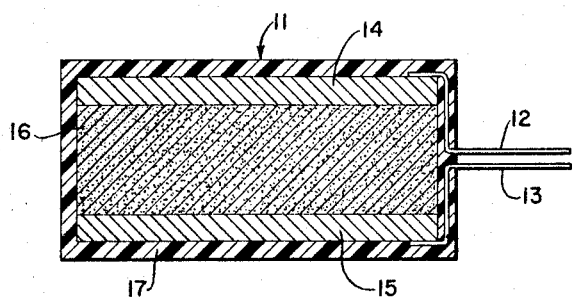
FIGURE 2 is a sectional view thereof.

In the drawings, which are not to scale, the capacitor 11 is provided with wire leads 12 and 13 which are, respectively, connected to the conductive electrodes 14 and 15. The latter are attached to the semiconductor ceramic disc 16 which is the base or core of the capacitor. The whole capacitor body is encapsulated in a conventional, non-conductive plastic which forms a covering 17.

Conventional ceramic capacitors comprise a disc or layer of a high dielectric constant ceramic material having spaced, metallic electrodes. It has previously been suggested that capacitors be formed from ceramic dielectric bodies that have been made semiconductive by heating them in a reducing atmosphere and then reoxidizing their surfaces and providing them with metal electrodes. It is, however, difficult to so regulate the reducing heat treatment of such bodies and their surface reoxidation as to obtain uniformity of capacity in the finished capacitors. Furthermore, excessive, undesired reoxidation of the reduced body may take place if the body is subjected for any prolonged period to temperatures even as low as 600° F.

Now it has been found that capacitors having high capacities per unit area and having relatively low dissipation factors can be conveniently made from sintered, ceramic, semi-conductive bodies comprising titania ($TiO_2$) and a small amount of a modifying oxide by providing such bodies with metallic electrodes that make non-ohmic contacts with the bodies. Such electrodes will from time to time hereinafter be referred to as "non-ohmic electrodes." Firing of the mixtures of titania and modifying oxide, specifically niobium pentoxide or antimony pentoxide, to form the sintered semi-conductive bodies may be carried out in a conventional oxidizing atmosphere.

The method employed to produce the novel capacitors of the present invention comprises the making of an intimate mixture of titania and the modifying oxide, both being in finely divided form and preferably with an average particle size of less than 10 microns. To ensure intimate mixing the powders may be triturated while moistened with a non-aqueous, volatile liquid such as acetone. After drying, if necessary, the mixture is calcined in an oxidizing atmosphere at a temperature in the range from about 2000° F. to about 2200° F. for a period of from about 1 to about 2 hours. The resulting sintered product is wet milled to a fine powder, preferably less than 10 microns average particle size, and after drying is mixed with a small amount of a temporary bond, such as polyvinyl alcohol or high molecular weight polyethylene glycols or the like and pressed into discs of the desired size. The compacting pressure is not critical but high density is desirable in the bodies and pressures of about 10,000 p.s.i. or greater are preferred. The green discs are fired in an oxidizing atmosphere being matured at temperatures of about 2500° F.–2600° F. The matured discs are painted, after cooling, with conventional conductive silver paste of the type used for forming silver electrodes and reheated for about 15–20 minutes at about 1500° F. in an oxidizing atmosphere to fire on the electrodes and form the capacitors.

In the following examples the production of capacitors in accordance with the present invention is described.

*Example 1*

Employing the procedure described above a capacitor was made from a mix consisting of 99.76 mol percent high purity titania and 0.24 mol percent $Nb_2O_5$. The blended powders were calcined at 2000° F. and a disc having a thickness of approximately ¼ cm. and a diameter of approximately 1 cm. was pressed from the milled calcined product at 10,000 p.s.i. and fired to maturity at 2550° F. under oxidizing conditions. After silver electrodes were fired on the resulting capacitor when tested at 25° C. and 1 kc. was found to have a capacity of approximately 26,000 pfd./cm.$^2$ and a dissipation factor of about 0.099.

*Example 2*

The procedure of Example 1 was substantially duplicated with the same ceramic mix. A capacitor having a capacity at 25° C. and 1 kc. of approximately 28,000 pfd./cm.$^2$ and a dissipation factor of about 0.093 was obtained.

*Example 3*

Using the procedure of Example 1 still another capacitor was made from a mix of the same high purity titania but with 0.49 mol percent $Nb_2O_5$ instead of 0.24 mol percent. The ceramic disc had a diameter of approximately 1 cm. and a thickness of approximately ¼ cm. After application of the silver electrodes the capacitor was tested at 1 kc. and 25° C. and was found to have a capacity of approximately 30,000 pfd./cm.$^2$ and a dissipation factor of about 0.277.

In some cases titania of 99% purity contains appreciable amounts of alumina and other trivalent metal oxides which at elevated temperatures will combine with the niobium pentoxide. It has been found that quite satisfactory capacitors can nevertheless be produced from such titania by the present novel process by supplying sufficient $Nb_2O_5$ to react with such trivalent metal oxides in addition to that $Nb_2O_5$ required to make the N-type semi-conductive ceramic that forms the body of the capacitor. This is illustrated in Examples 4–7, inclusive.

Example 4

Using a mix consisting of a relatively pure grade of titania and approximately 0.18 mol percent of $Nb_2O_5$ in addition to the small amount added to compensate for the alumina and other trivalent metal oxides present a capacitor was made by the procedure set forth above. A calcining temperature for the oxide mixture of 2150° F., a molding pressure of 10,000 p.s.i., and a firing temperature of 2550° F. were employed. After silvering the semi-conductive disc, which was about 2.4 cm. in diameter and ½ cm. in thickness, it was tested at 25° C. and 1 kc. and found to have a capacity of approximately 29,000 pfd./cm.$^2$ and a dissipation factor of about 0.066.

Example 5

A capacitor formed in the same way as in Example 4 from a mix containing the same grade of titania but including 0.30 mol percent of $Nb_2O_5$ in excess of that necessary to compensate for trivalent metal oxides was found when tested at 25° C. and 1 kc. to have a capacity of approximately 28,000 pfd./cm.$^2$ and a dissipation factor of approximately 0.062.

Example 6

A capacitor formed in the same way as in Examples 4 and 5 from a mix containing the same grade of titania used in those examples but including 0.43 mol percent of $Nb_2O_5$ in excess of that necessary to compensate for trivalent metal oxide impurities was tested at 25° C. and 1 kc. It had a capacity of approximately 21,000 pfd./cm.$^2$ and a dissipation factor of about 0.116.

Example 7

A capacitor was formed according to the procedure of Examples 4–6 from a mixture of $Nb_2O_5$ with a somewhat less pure titania that contained over 1% by weight of impurities. The mix comprised 0.3 mol percent of $Nb_2O_5$ in addition to the amount required to compensate for the trivalent metal oxides present as impurities in the titania. The capacitor obtained was tested at 25° C. and 1 kc. and found to have a capacity of approximately 24,000 pfd./cm.$^2$ and a dissipation factor of about 0.076.

Even from a titania which included as impurities almost 2% by weight of alumina and other trivalent metal oxides a capacitor was obtained by the process described above which had a capacity of approximately 11,000 pfd./cm.$^2$. The mix employed contained in addition to the niobium pentoxide added to compensate for the trivalent metal oxides approximately 0.3 mol percent of $Nb_2O_5$.

Capacitors of the type with which the present invention is concerned may also be produced using antimony pentoxide instead of niobium pentoxide. This is illustrated in the following example.

Example 8

A capacitor was made from a mix consisting of high purity titania and 0.22 mol percent of $Sb_2O_5$ using essentially the same procedure as in Examples 4–6. A mix calcination temperature of 2000° F. was employed and the pressed finely powdered sinter was fired in an oxidizing atmosphere at 2450° F. The capacitor obtained was tested at 25° C. and 1 kc. and was found to have a capacity of about 16,000 pfd./cm.$^2$ and a dissipation factor of approximately 0.063.

As indicated in the foregoing examples, in producing capacitors according to the present invention the non-ohmic electrodes may be most conveniently applied to the opposite faces of the semi-conductive ceramic discs by coating the discs with conductive silver paste and subsequently refiring them. However, it has been found that non-ohmic electrodes of gold or platinum can be formed on such semi-conductive discs by applying commercial electrode pastes containing the appropriate metal and firing the coated discs to produce a metal coating thereon, for example, at 1500° F. for 20 minutes. In tests using semi-conductive ceramic discs produced in accordance with Example 5 it was found that a capacitor formed with non-ohmic gold electrodes on such a disc had a capacity of about 56,000 pfd./cm.$^2$ and a dissipation factor of about 0.10 while a capacitor formed with non-ohmic platinum electrodes on one of such semi-conductive discs had a capacity of approximately 23,000 pfd./cm.$^2$ and a dissipation factor of about 0.10.

In producing capacitors according to the invention the modifying pentavalent oxide, $Nb_2O_5$ or $Sb_2O_5$, may be present in a percentage of the mix from which the ceramic discs are formed ranging from about 0.15 to about 0.5 mol percent when using a very pure titania. When the titania used contains appreciable amounts of alumina and/or other trivalent metal oxides the mix should include an amount of pentavalent modifying oxide within the stated range in addition to the amount of pentavalent oxide added to compensate for the trivalent metal oxides present. Since the alumina and the like picked up in milling and grinding the oxide mixtures should also be compensated for, care should be taken to minimize such pick up, particularly after calcination.

The capacitors resulting from the procedure set forth in the preceding examples are classed as symmetrical since they have non-ohmic electrodes on opposite faces of the ceramic discs. If desired, asymmetrical electrical components may be produced by providing a non-ohmic electrode on only one face of the semi-conductive ceramic disc and providing on the opposite face of the disc an electrode which makes an ohmic contact therewith, i.e. an ohmic electrode. Such an ohmic electrode can be formed by conventional methods using, for example, an indium-gallium alloy.

It will be seen that capacitors according to the present invention have high capacities per unit area. Such capacities have herein been defined in terms of pfd. (piccofarads) per cm.$^2$ of projected area, i.e. the area of a single flat face of the capacitor. Because of their high capacities per unit area they lend themselves to use in transistor circuitry where small physical size is important.

I claim:

1. A ceramic capacitor having a capacity of at least about 10,000 pfd./cm.$^2$ and a suitably low dissipation factor comprising a semi-conductive, sintered ceramic body formed from a mixture of titania and a pentavalent modifying oxide selected from the group consisting of $Nb_2O_5$ and $Sb_2O_5$, and a pair of spaced metallic electrodes attached to said body, at least one of said electrodes having a non-ohmic contact with said body.

2. A capacitor as set forth in claim 1 in which an electrode having a non-ohmic contact with said body is formed of a metal selected from the group consisting of silver, gold, and platinum.

3. A capacitor as set forth in claim 2 in which the electrode is of silver.

4. A capacitor as set forth in claim 1 in which both of said electrodes have non-ohmic contacts with said body.

5. A capacitor as set forth in claim 1 in which the modifying oxide is $Nb_2O_5$.

6. A capacitor as set forth in claim 1 in which the modifying oxide is $Sb_2O_5$.

7. A capacitor as set forth in claim 1 in which the pentavalent modifying oxide is present in an amount within the range from about 0.15 to about 0.5 mol percent in addition to such amount of modifying oxide as may be required to compensate for trivalent metal oxide impurities present.

8. A capacitor as set forth in claim 7 in which both of said electrodes have non-ohmic contacts with said body.

9. A capacitor as set forth in claim 7 in which an electrode having a non-ohmic contact with said body is formed of a metal selected from the group consisting of silver, gold, and platinum.

10. A capacitor as set forth in claim 9 in which the electrode is of silver.

11. A capacitor as set forth in claim 7 in which the modifying oxide is $Nb_2O_5$.

12. A capacitor as set forth in claim 7 in which the modifying oxide is $Sb_2O_5$.

References Cited by the Examiner

UNITED STATES PATENTS

| | | | |
|---|---|---|---|
| 2,962,452 | 11/1960 | Counts | 106—39 X |
| 3,033,907 | 5/1962 | Rue | 106—39 X |

FOREIGN PATENTS 664,403   1/1952   Great Britain.

OTHER REFERENCES

Birks, F. B., Modern Dielectric Material, Heywood & Co., London, 1960, pp. 191 and 167–171, QC 585B5.

"Electronic Design," May 1955, p. 38.

Johnson et al., Journal American Ceramic Society, December 1949, vol. 32, No. 12 (pp. 398–401), T.P. 785A62.

LEWIS H. MYERS, *Primary Examiner.*

LARAMIE E. ASKIN, JOHN F. BURNS, *Examiners.*

E. GOLDBERG, *Assistant Examiner.*